UNITED STATES PATENT OFFICE.

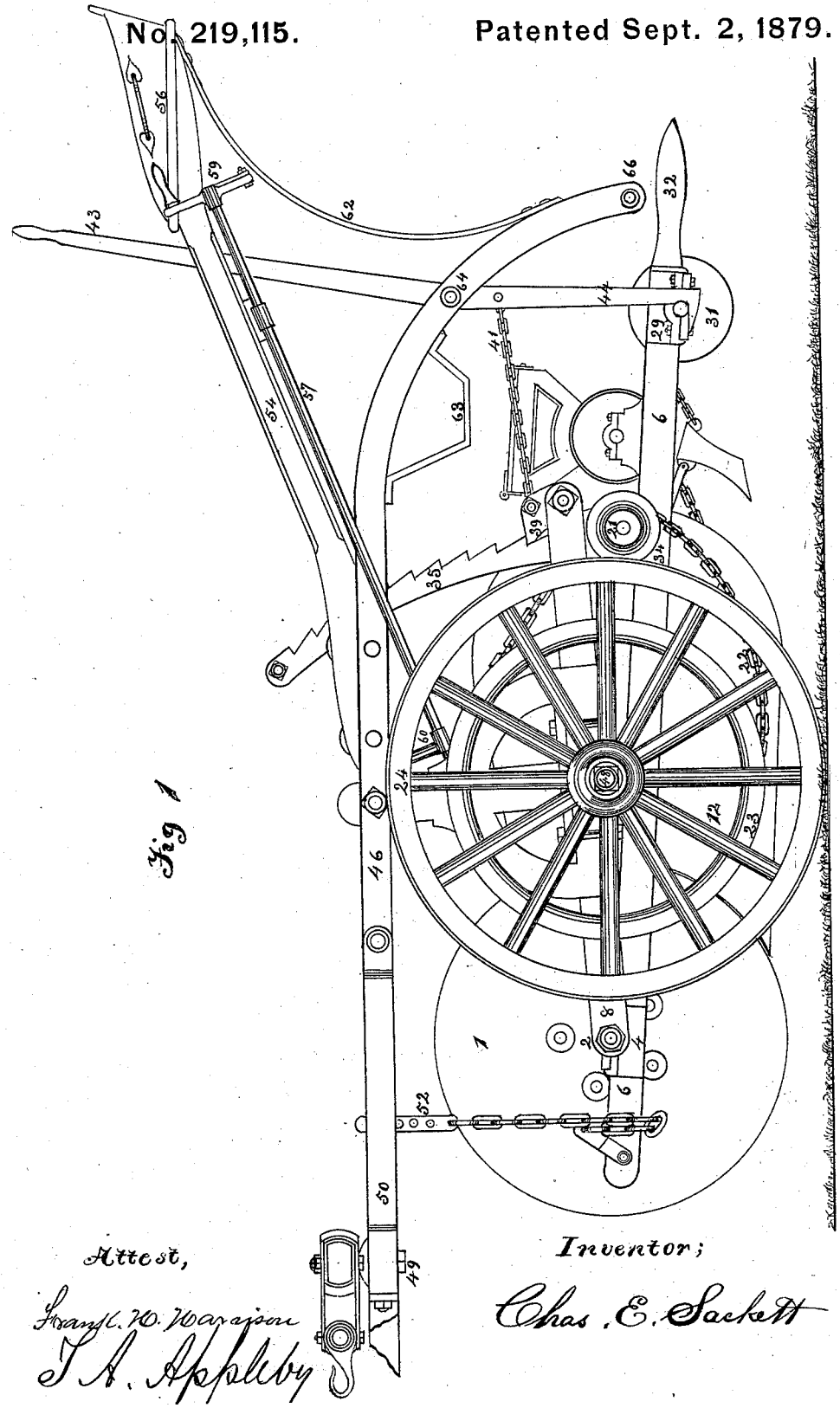

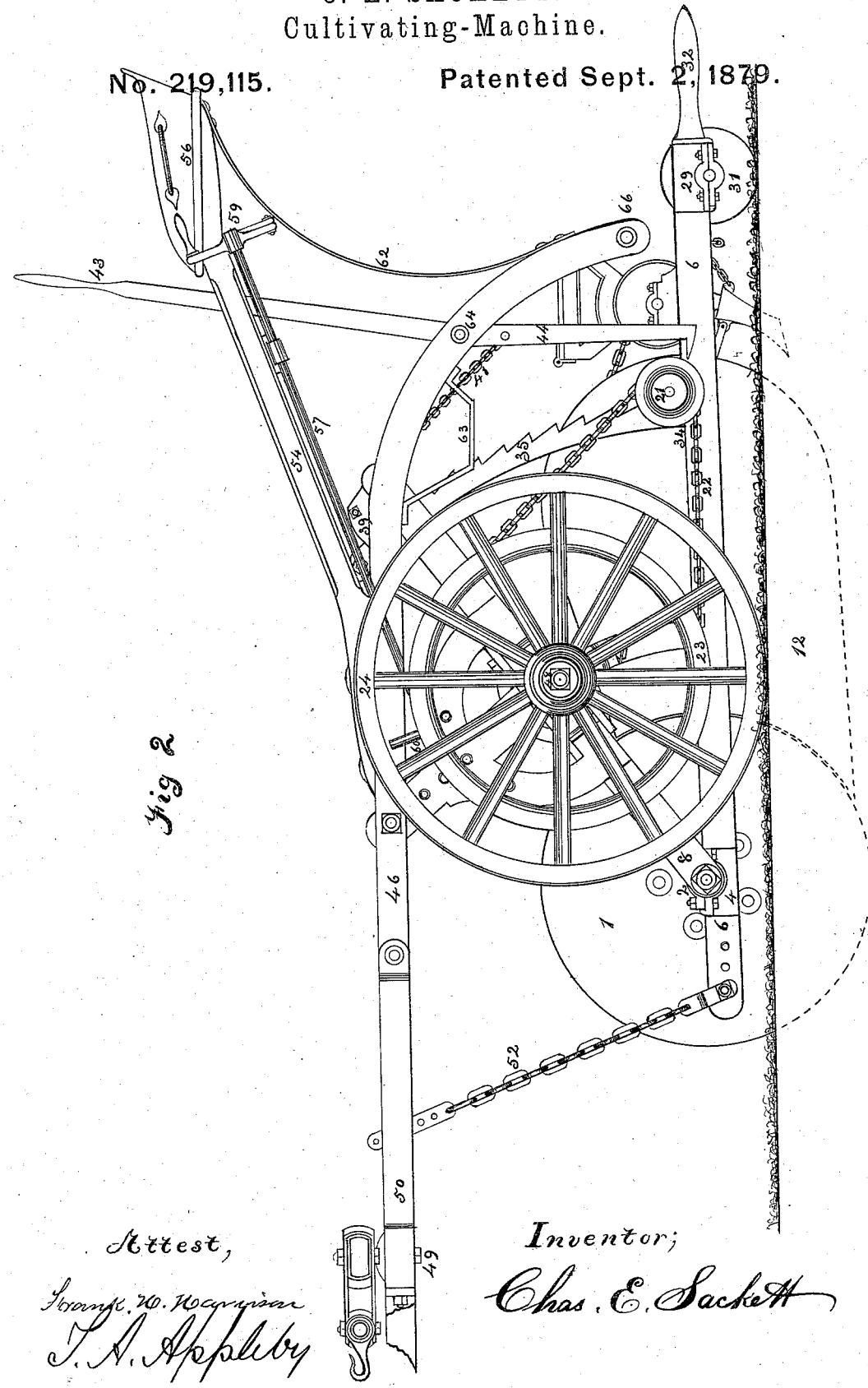

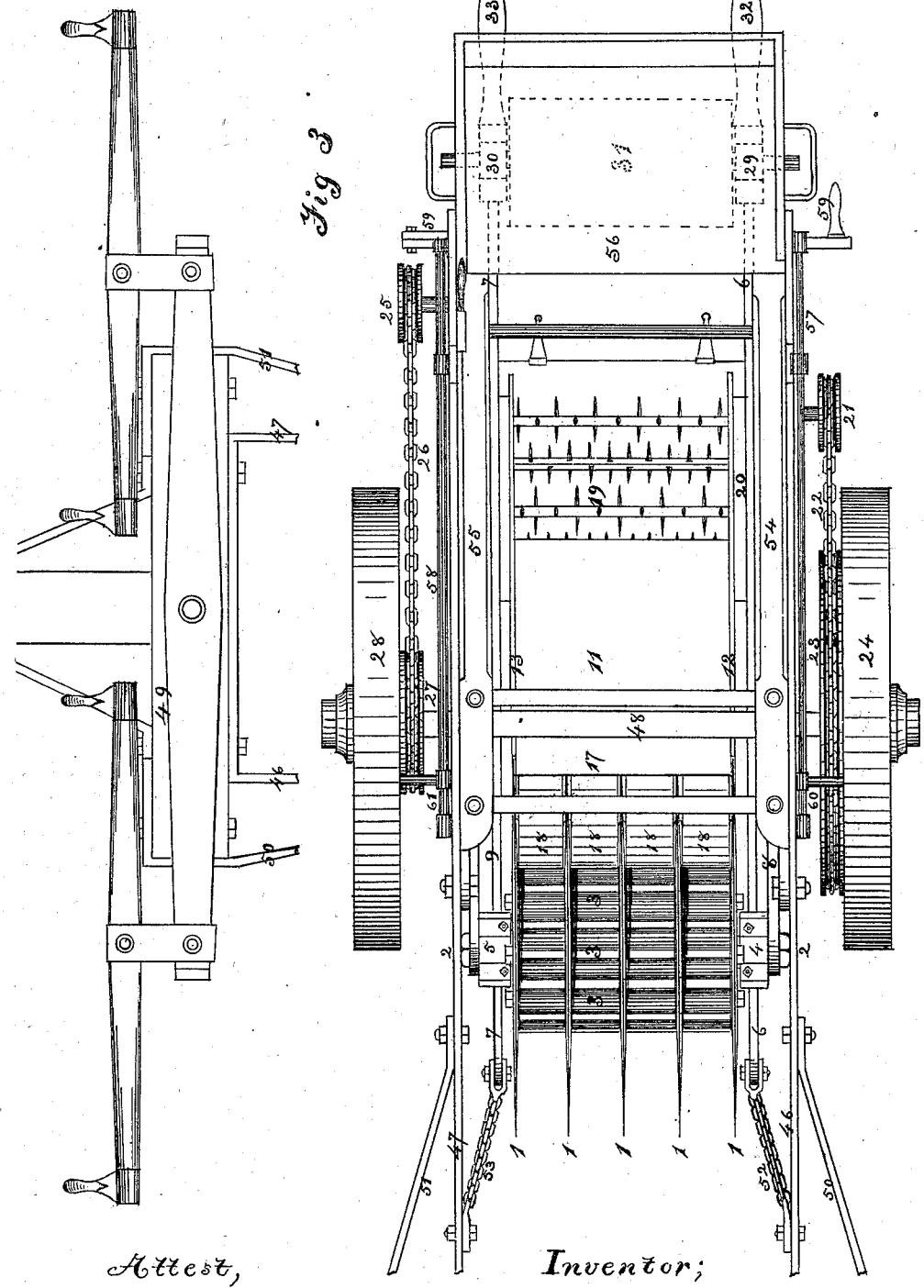

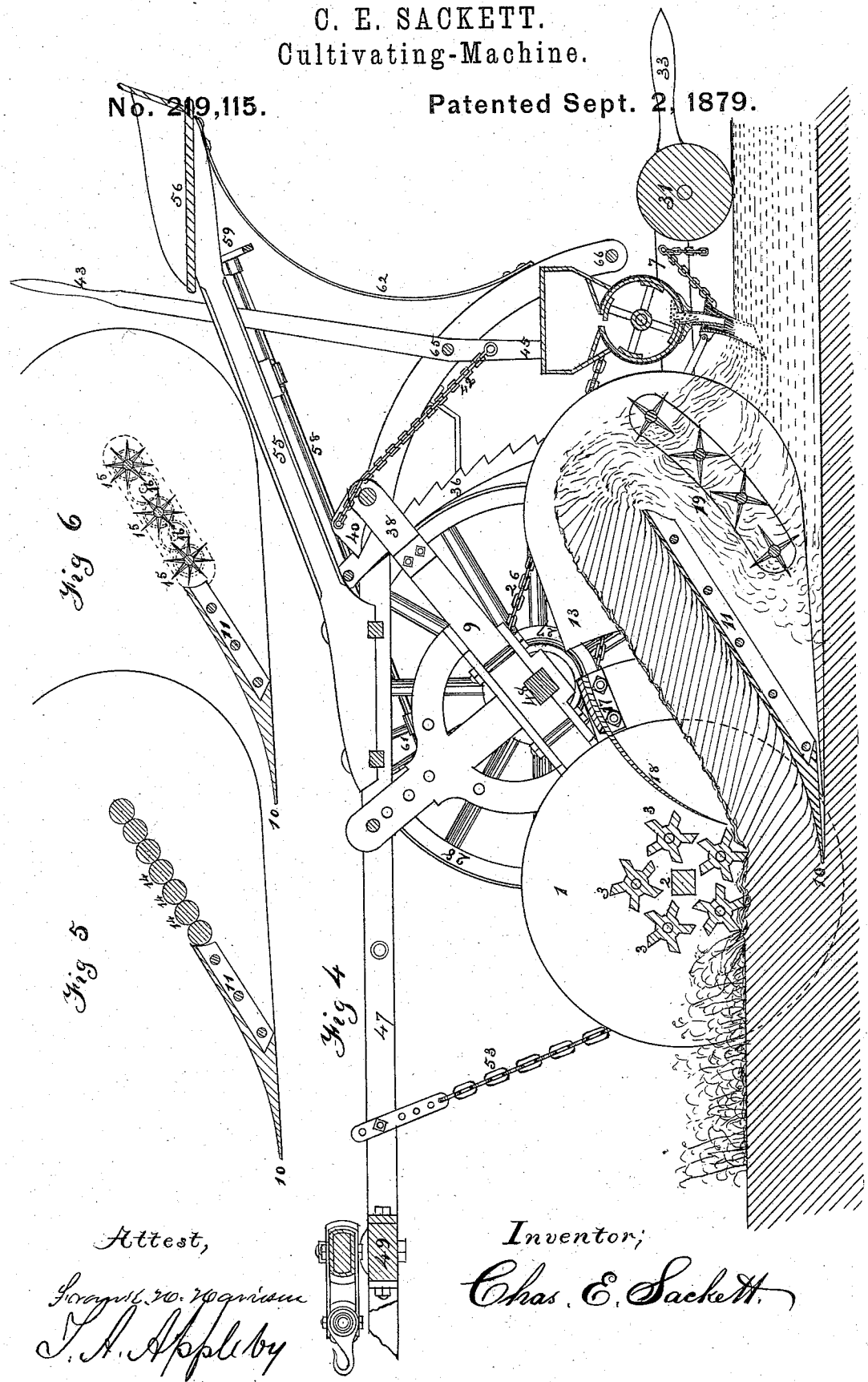

CHARLES E. SACKETT, OF MATILDA FURNACE, WAYNE TOWNSHIP, MIFFLIN COUNTY, PENNSYLVANIA.

IMPROVEMENT IN CULTIVATING-MACHINES.

Specification forming part of Letters Patent No. 219,115, dated September 2, 1879; application filed March 17, 1879.

*To all whom it may concern:*

Be it known that I, CHARLES E. SACKETT, of Matilda Furnace, Wayne township, Mifflin county, and State of Pennsylvania, have invented certain new and useful Improvements in Cultivating-Machines for preparing the soil for planting and planting it in one continuous operation; and I do hereby declare that the following specification is a full, clear, and exact description of my invention, and such as will enable others skilled in the art to which it pertains to make and use the same, reference being had to the accompanying drawings, which form part of this specification.

The invention relates to improvements in that class of tilling implements which, by rotary cutters and spades, picks, or other devices, disintegrate and lift the earth from the track over which they pass, and, dropping it behind them, leave it lying more or less pulverized in the furrow so made, and directly in the path of the implement.

In the accompanying drawings, Figure 1 is a side elevation of the implement raised ready for road use or to turn a furrow-corner in the field. Fig. 2 is a side elevation of the implement lowered, as at work in the field. Fig. 3 is a plan view. Fig. 4 is a section between any two of the revolving cutters while the implement is lowered at work in the field. Fig. 5 is a section of the fixed spade when composed in part of smooth friction-rollers actuated by outside gears or not. Fig. 6 is a section of the fixed spade when composed in part of toothed rollers actuated by outside gears at any desired speed, for the purpose of pulling the earth up the inclined spade, or for tearing it apart, performing part or all the work of a sifting-grate.

My invention includes combination of parts and details of construction, all of which will now be more fully set forth and specifically claimed.

In the drawings similar figures of reference indicate like parts.

1 1 1 are a series of revolving circular cutters, placed a convenient distance apart upon a common axis; 2, which axis is surrounded by a series of smaller knife-edged rollers, 3 3 3, revolving upon their own axis, and which serve to keep the cutters a uniform distance apart, and form the forward bearing of the implement upon the earth when the cutters are sunk in the earth, and, by reason of their knife-edges and the weight and pressure upon this part of the implement, cut and crush all the weeds or stalks over which the implement passes, thus aiding in the future operation of pulverizing and covering them.

The central axis of the revolving cutter is journaled into bearings 4 5, bolted to the lower carrying side bars, 6 7, passing through which, it forms pivots for the lower arms of the rocking T-levers 8 9, which play upon them, and are secured upon them by nuts at their extremities.

Immediately behind the revolving cutters, and projecting between them as far as may be found desirable, are a series of plow-points, 10 10 10. These plow-points unite immediately back of the revolving cutters to form a common flat fixed spade, 11, having an extreme width the same as the two extreme revolving cutters, and being inclosed on both sides to a distance above and below the plane of said spade equal to the depth of cut by two perpendicular side plates, 12 13, which serve to confine the earth upon the spade above, and to keep the furrow open for the prepared earth to fill up below. This spade and points may be constructed of one or more similar lengths set side and side, or of one spade with changeable points. It may be provided for more or less of its length with a series of smooth friction-rollers, as 14 14 14 in Fig. 5, or with a series of toothed rollers, as 15 15 15, actuated by outside gears, 16 16 16, in Fig. 6. This fixed spade and side plates are set at a proper incline to secure an easy entrance into the earth, and are secured by bolts together and to the lower carrying side bars, 6 7.

At a convenient distance above the fixed spade, and bolted upon a common carrying-bar, 17, secured to the sides of the implement, are a series of cleaning-blades, 18 18 18, which project between each pair of adjacent revolving cutters, and serve to scrape the earth that may adhere to their sides back upon the spade, or to prevent the earth revolving with the cutters and fast between them.

At a convenient distance behind the fixed spade, and bolted to the lower carrying side bars, 6 7, is placed a rotary sifting-grate, 19, upon which all the earth lifted and passed rearward by the foregoing devices is dumped. The bars of this rotary sifting-grate are rotated by the gear-train inclosed in the gear-box 20, through which the upper bar is continued, and terminates in a chain-wheel, 21, driven by the chain 22 from the chain-wheel 23, fast upon the side of one of the carrying-wheels 24.

At a convenient distance behind the sifting-grate, and bolted to the lower carrying side bars, 6 7, is placed a seed-drill of convenient device for automatic planting, and operated by the chain-wheel 25, driven by the chain 26 from the chain-wheel 27, fast upon the side of the other carrying-wheel, 28.

At a convenient distance behind the seed-drill, and journaled in the lower carrying side bars, 6 7, by means of the boxes 29 30, bolted to them, is placed a roller, 31, of suitable diameter to sustain the lower carrying side bars and their attachments at a fixed distance from the earth, and to perform the operation of rolling the earth over the seed after planting.

The lower carrying side bars now terminate in handles 32 33, which may be carried to any convenient length to enable the operator to lift the lower carrying side bars and their attachments by hand, if he desires; but this operation is intended to be performed by the draft-power, operating through the following devices: From a point, 34, upon the lower carrying side bars, spring up the ratchet-segment bars 35 36, which pass through guide-loops 37 38 upon the extremities of the upper arms of the T rocking levers. These loops inclose self-acting catches 39 40, which engage with the segment-bars, at the will of the operator, through the chains 41 42, attached to the hand-lever 43, which also actuates the carrying-hooks 44 45 for sustaining the lower carrying-bars by the roller-journals, which are continued out for that purpose. At a point about midway between the extremities of the upper and lower arms of the T rocking levers a third arm projects, at whose extremity, or at any of the adjustable holes for that purpose along its length, is bolted the upper draft-bars, 46 47. At the base of this arm the T rocking levers are firmly secured by a suitable attachment to the main carrying-axle 48, which is journaled in the carrying-wheels 24 28, by which the T rocking levers are supported and about whose centers they swing. The upper draft-bars continue forward and terminate in a cross-beam, 49, to which is fixed the team attachments, and from whose extremities they are stiffened by the braces 50 51. From a point on these draft-bars just back of the cross-beam depend stay-chains 52 53, which are attached to the lower carrying side bars just forward of the revolving cutter-boxes, at any of the adjustable holes for that purpose. The stay-chains also admit of being lengthened or shortened by adjustable bolt-holes. From a point on the draft-bars just back of their attachment to the T rocking levers extend, at a convenient angle, supports 54 55, to sustain a driver's seat, 56. Along these supports, on either side, extend stop-rods 57 58, actuated by the handle and crank-rods 59, and terminating in the stops and bearings 60 61, for the purpose of engaging and holding the carrying-wheels fast to the T rocking levers at will. Braces or springs 62 further support the driver's seat. The draft-bars 46 47, being further continued rearward, form the bearings for a step, 63, for mounting the implement, the bearings 64 65 for the hand-lever and hooks supporting the lower side bars, and terminate in a cross-bar, 66, which prevents the lower side bars from coming up too high by the action of the team in raising the implement.

The operation of the implement is as follows: On entering a field to be plowed, harrowed, and planted, the implement is sustained as in Fig. 1. The operator on the seat pushes the hand-lever 43 forward. This withdraws the hooks 44 45 from under the roller-journals, and at the same time withdraws the ratchet-catches 39 40 by the pull on the chains 41 42. Having nothing to sustain them, the lower carrying side bars with their attachments drop at once to the earth. As the team starts the whole weight of the implement and operator, operating through the T rocking levers, will be brought to bear upon the revolving-cutter edges, which, sinking in the earth, will slice the earth vertically just ahead of the cut of the plow-points horizontally, and the implement will naturally sink into the earth until it bears upon the knife-edge rollers between the revolving cutters. The forward stay-chains prevent the implement turning over when it meets the resistance of the plow-points. The lower side-plate edges sink in the track of the two extreme revolving cutters, keeping the furrow open for the re-entrance of the prepared earth through the sifting-grate, and the rear roller brings the whole implement to its working bearing.

The lower carrying side bars may be sustained at any height rearward by allowing the ratchet-catches to engage the ratchet-bar at any of its teeth. Having reached the end of the furrow or turning-point, the operator, by turning the handle and crank-rods 59, communicating with the stops 60 61, engages the carrying-wheels with the rocking levers, and, leaving the ratchet-catches engaged in the ratchet-segment, has both hands free to back his team, which, doing slightly, the carrying-wheels and axle forming an ample fulcrum, the lower arm of the rocking levers will bring the revolving cutters from the earth, while, the higher arm passing down the ratchet-segment bar, the catches, which move with it, engage the lowest tooth, when a forward movement of the team will bring up the balance of the implement to the position of Fig. 1 again. The supporting-hooks are now adjusted and the wheel-stops withdrawn, when the implement is ready to travel, or to turn and be dropped again.

Having now fully described my invention, what I claim as new, and desire to secure by Letters Patent, is—

1. In a tilling implement combining two or more revolving cutters and a rotary sifting-grate or harrow, the interposition between them of a fixed spade composed of plowing-points projecting between said cutters and uniting back of them to form a common spade-surface, so inclined that the earth divided by the cutters shall be raised, passed rearward, and dropped into the furrow so made, or upon pulverizing or sifting devices, substantially as described and shown.

2. In a tilling implement combining a fixed spade and a rotary sifting-grate, the combination therewith of two side plates, 12 13, inclosing the said spade and sifting-grate, and extending above and below the plane of their surfaces or centers a sufficient height and depth to confine the upcoming earth upon them, and to keep open the furrow-space below them for the redeposit of the earth after preparation by the sifting-grate, substantially as described and shown.

3. In a tilling or planting implement, the combination therewith of a rotary sifting-grate provided with revolving toothed bars having a forced rotation, and for the purpose of harrowing or preparing the earth raised by the tilling devices in one continuous operation, whether for the purpose of planting in the same operation or not, substantially as shown and described.

4. In a tilling implement combining a revolving cutter, a fixed spade, and a rotary sifting-grate, the combination therewith of an automatic planting attachment of convenient device, whereby the earth may be planted at the same time as tilled, and in one and the same continuous operation, substantially as described and shown.

5. In a tilling implement, the seat 56, draft-bars 46 47, in combination with the T rocking levers 8 9, ratchet-posts 35 36, frame 6 7, with its cultivating attachments, lever 43, and axle, arranged, as described, to cause the driver's weight to assist in forcing the implement into the earth, or to raise and sustain it above the ground, substantially as shown and described.

6. In a tilling implement, the combination therewith of an adjustable triangular lifting and carrying arrangement composed of the T rocking levers 8 9, supported on the axle 48, the cultivating-attachment bars 6 7, and ratchet-posts 35 36, whereby, the carrying-wheels and axle serving as a fulcrum, the power of the team, acting through the T rocking levers at either end, alternately serves to raise or sustain the implement from the earth at will, substantially as shown and described.

In testimony whereof I have signed my name to this specification in the presence of two subscribing witnesses.

CHAS. E. SACKETT.

Witnesses:
 FRANK H. HARRISON,
 T. A. APPLEBY.